United States Patent

[11] 3,545,343

[72] Inventor Einar M. Orbeck
 West Hartford, Connecticut
[21] Appl. No. 721,328
[22] Filed April 15, 1968
[45] Patented Dec. 8, 1970
[73] Assignee United Aircraft Corporation
 East Hartford, Connecticut
 a corporation of Delaware

[54] WELDED FLUID SEAL
 5 Claims, 3 Drawing Figs.
[52] U.S. Cl. .................................................. 92/165,
 92/23; 60/39.48; 222/389
[51] Int. Cl. ................................................. F16j 15/02,
 F16j 15/16
[50] Field of Search .......................................... 92/15, 23,
 165, 168; 137/70, 797, 67, 68, 71; 222/(Inquired),
 386, 327, 389, 390, 391; 60/(Inquired), 39.48;
 251/(Inquired)

[56] References Cited
 UNITED STATES PATENTS
 920,729 5/1909 Cooper ......................... 137/71X
 2,649,999 8/1953 Burch .......................... 222/386UX
 2,724,616 11/1955 Biginelli ....................... 137/797X
 2,790,424 4/1957 Giladett ........................ 92/23
 2,959,004 11/1960 Greiner ........................ 60/39.48
 2,986,004 5/1961 McKenney ................... 60/39.48X
 2,987,610 6/1961 Steigerwald .................. 219/117
 3,161,325 12/1964 Hinkel et al. ................. 222/80
 3,193,146 7/1965 Isgriggs et al. ............... 222/391X
 FOREIGN PATENTS
 811,706 4/1959 Great Britain ................ 137/70

Primary Examiner—Martin P. Schwadron
Assistant Examiner—Irwin C. Cohen
Attorney—Melvin Pearson Williams ABSTRACT: A deep weld between a piston and a cylinder provides a metallic seal for fluid to be stored over a long period of time. The dimension of the weld is chosen so that it will shear in response to a determined force on the piston; a frangible disc may seal the other end of the fluid holding cylinder chamber. Inserts may be provided having a lower shear constant than that of the metal of which the cylinder or the piston need be formed. Preshaping of the joined area provides close tolerance of force required to shear with less tolerance on the weld itself.

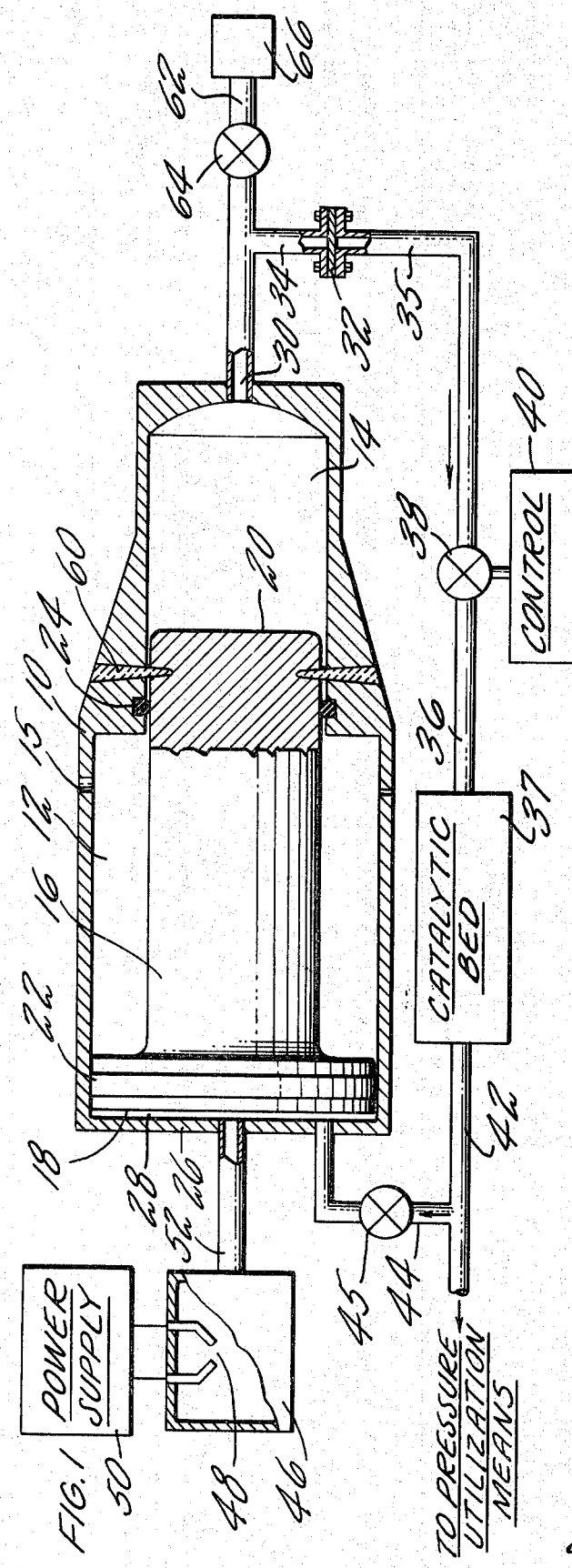

WELDED FLUID SEAL

BACKGROUND OF THE INVENTION

1. Field of Art

This invention relates to static fluid seals and more particularly to a static fluid seal formed by welding processes.

2. Description of the Prior Art

There are many scientific endeavours which require storage of fluid over a long period of time in a mechanism capable of utilizing the fluids upon demand. A partial solution to the problem is found in the use of frangible disks in series with, or in place of ordinary valves. However, where relative motion of a pair of parts will result when the fluid is utilized, a frangible disk has not heretofore been capable of implementation. Although some attempts have been made to improve upon dynamic seals, these have been found to be unsuitable over long periods of time. For instance, O-rings have a tendency to lose resilience thereby permitting leakage.

SUMMARY OF THE INVENTION

The object of the present invention is to provide an absolute seal for fluids over a long period of time between relatively movable parts, the seal being compatible with movement of the parts when utilization of the fluid occurs.

According to the present invention, the surfaces of two relatively moving parts are joined together by welding so as to provide an absolute metallic bond between the surfaces and, therefore, a complete seal for fluids. The dimensions of the weld are so chosen as to permit shearing of the welded seal in response to a predetermined force. In further accord with the present invention, the weld may be formed simply, from the external surface of the apparatus, such as is achievable with a deep weld process of the type involving an electron beam welder. In still further accord with the present invention, inserts of metals different from the metals of the parts being sealed may be provided so as to alter the characteristics of the seal in comparison with the characteristics of the material of which the parts to be sealed are formed. In still further accord with the present invention, the surfaces to be joined for the purpose of providing a fluid seal may be preshaped so as to accurately control the thickness of the seal and therefore the force required to rupture the seal, without requiring precise control over the welding process per se.

The foregoing and other objects, features and advantages of the present invention will become more apparent in the light of the following detailed description of a preferred embodiment thereof, as illustrated in the accompanying drawing.

DESCRIPTION OF THE DRAWING

FIG. 1 is a partially sectioned side elevation of a cylinder and piston employing one embodiment of the present invention, including a schematic illustration of a portion of an exemplary environment therefor; and FIGS. 2 and 3 are sectioned, partial side elevations of an alternative embodiment of the present invention before and after formation of the weld, respectively.

DESCRIPTION OF THE PREFERRED EMBODIMENT

Referring now to FIG. 1, a cylinder housing 10 has a large diameter chamber 12 and a smaller diameter fluid chamber 14. The chamber 12 is vented to atmosphere by a suitable port 15. Disposed within the cylindrical housing 10 is a piston 16 having a large diameter driven surface 18 and a smaller diameter driving surface 20. The piston 16 is provided with a pair of dynamic seals 22, 24 which may comprise O-rings retained in suitable grooves within the housing 10. An end wall 26 of the cylindrical housing 10 together with the driven end 18 of the piston 16 and the dynamic seal 22 encloses a subchamber 28 within chamber 12 which may receive fluid under pressure so as to drive the piston 16 into the fluid chamber 14 (from left to right in FIG. 1).

The object of the exemplary apparatus of FIG. 1 is to drive a monopropellant fluid (such as hydrazine-$N_2H_4$) through a pair of conduits 30, 34 by applying sufficient force so as to rupture a frangible disk 32. The fluid may then pass over a pair of conduits 35, 36 to a catalytic bed 37, provided that a valve 38 is opened in response to a control 40, which may comprise a solenoid, or any other suitable control. This control may be used to implement design criteria of the utilization apparatus, and is not germane to the present invention. The catalytic bed 37 will cause the decomposition of the monopropellant fuel, the gasification of which results in gas under high pressure which may be passed over a conduit 42 to fluid pressure utilization means. The particular application of the fluid under pressure is not germane to the present invention, and may comprise any number of well-known pressure responsive devices. For instance, the fluid pressure may be utilized for course correcting thrusters in a spaceship. A portion of the pressurized gas generated by the catalytic bed 37 is passed over a conduit 44, through a check valve 45 (or fluid diode), into the chamber 28 to continue the motion of the piston 16 so as to force additional fuel from the chamber 14 in response to pressure generated by the fuel. This form of regenerative decomposition of a monopropellant is well known.

In order to commence the operation of the device, a solid fuel combustor 46 (such as a squib gas generator) may be provided with suitable electrodes 48 which, when activated by a power supply 50 will cause burning of the solid fuel, thus creating pressurized gas to be passed over a conduit 52 into the chamber 28 so as to initiate motion of the piston 16, as described hereinbefore.

The present invention resides in a static seal formed by welding. As illustrated in the embodiment of FIG. 1, the seal 60 comprises welds which may be formed by a deep welding process by application of a suitably controlled energized beam from outside of the cylindrical housing 10 so as to cause a deep narrow weld to be formed through the cylindrical housing 10 and into the body of the piston 16, causing them to be joined annularly as a result of the weld. Such deep welds may be made according to the teachings of U.S. Pat. No. 2,987,610, issued to K. H. Steigerwald on June 6, 1961.

One of the features of the present invention is the fact that the seal 60 may be provided by means of a deep weld formed by a suitably controlled energized beam applied from outside of the cylindrical housing 10. In other words, intricate machining and assembly techniques are not required in order to provide a suitable static seal. The amount of pressure required to rupture the static seal 60 is controlled by controlling the width of the weld at the point where the cylinder housing 10 is joined to the piston 16 by the weld 60. The force required to rupture the static seal 60 is determined to be less than that which results from the pressure obtainable from the solid fuel combustor 46 distributed over the area of the driven end 18 of the piston 16. In addition, the area of the driven end 18 of the piston 16 is chosen with respect to the area of the driving end 20 of the piston 16 so that taking into account normal pressure drops along the conduits 30, 34—36, 42 and 44, as well as the valves and the catalytic bed, the pressure generated at the catalytic bed will be sufficient to cause the piston 16 to continue driving additional fluid out of the fluid chamber 14. The pressure at the conduits 42, 44, and therefore substantially the pressure applied to the chamber 28 which drives the piston 16, must of course bear a proper relationship to the pressure requirements of the pressure utilization means. With these factors in mind, it is possible to determine the sizing of the cylindrical housing 10 and piston 16, the pressure requirements of the solid fuel combustor 46, and the shear strength of the static seal 60. Of course, the force required to rupture the static seal 60 is also a function of the length of the seal (that is, of the periphery of the cylinder 16).

In order to insure that a perfect fluid seal is provided by a deep weld (static seal 60), it is necessary to provide a sufficient thickness of metal to insure against voids within the metal. For instance, if the material of the cylindrical housing 10 and piston 16 is some form of stainless steel, then a minimum thickness of the static seal 60 at the joinder of the piston 16 with the cylindrical housing 10 might be on the order of magnitude of .018 inch. For a given size cylinder, the lower the thickness of the static seal material, the less force is required in order to rupture the seal. Therefore, a relatively thin seal is advantageous in terms ro force required to rupture it.

In order to initially fill the chamber 14 with fluid, a spur conduit 62 is connected to a source of fluid, and when the chamber 14 is essentially full (leaving space for expansion and contraction as a result of heat differentials) a valve 64 may be closed. Thereafter, an end cap 66 may be welded in place so as to permanently seal off the spur 62.

Additional features of the present invention are illustrated in the embodiment shown in FIGS. 2 and 3. Therein, the cylindrical housing 10a is provided with an insert 70 which may be made of a metal different from the metal forming the cylindrical housing 10a. Similarly, the piston 16a may be provided with an insert 72 which may be of a metal different from that of the piston 16a. The inserts 70, 72 may be pressed fit. As shown in FIG. 2, the insert 70 may have a land 74 formed therein. This provides two advantages. First, the width of the actual joint formed by the weld between the insert 70 and the insert 72 will be determined by the width of the land 74, rather than by the control of the weld operation itself. As illustrated by the dashed line 76, an energized beam used for welding may be so adjusted so as to provide a width at the point of joinder of the insert 70 and 72 which is in excess of desired shear thickness at the joint. However, as illustrated in FIG. 3, the weld will only be as wide as the land 74 at the point of joinder of the inserts 70 and 72. Second, the clearance between piston and cylinder is increased in all other places.

An example, consider the embodiment of FIGS. 2 and 3 designed for a system which requires 500 p.s.i. in the conduit 42 in order to satisfy the demands of the pressure utilization means. Assuming (as experience shows is reasonable) that the pressure drop between the chamber 14 and the chamber 18 is on the order of magnitude of 200 p.s.i., then the pressure applied by the piston 16 within chamber 14 must be approximately 700 p.s.i. If the diameter of the driving face 20 of the piston 16 is 8½ inches, the area is approximately 57 square inches so that approximately 40,000 pounds of force must be overcome in order to cause the piston to move from the left to the right so as to continuously force additional fuel out of the chamber 14. This 40,000 pounds must of course be applied to the driven surface 18 of the piston 16, and this must be achieved with a 500 p.s.i. pressure (that is, the design goal of the system to satisfy the pressure utilization means). In order to generate 40,000 pounds of force with a pressure of 500 p.s.i., a surface area of about 80 square inches is required. This can be achieved with approximately a 10 inch diameter for the driven surface 18 of the piston 16. In order to cause the piston 16 to move from left to right upon initiating the operation of the apparatus it is necessary that the squib gas generator 46 be capable of supplying at least 40,000 pounds of force to the surface 18 of the piston 16. The force supplied by the squib gas generator must be adequate to rupture the static seal 78. Thus the thickness of the land 74 must be determined in conjunction with the metal of which the inserts 70 and 72 are made so as to be rupturable at less than the force supplied to the piston 16 by the squib gas generator 46. In the given example, assume that the inserts 70, 72 are comprised of AISI 347 stainless steel (commonly referred to as "347 stainless steel"). This has a shear strength constant of approximately 40,000 to 44,000 p.s.i. With the assumed 8½ inch diameter of the piston 16 in the area of the insert 72, this will result in a land thickness on the order of magnitude of .020 inch. Similar configurations may typically result in thicknesses of between .020 and .060 inch. Of course, if the diameter of the piston 16 in the area of the insert 72 is increased, then more force is required since there is more weld material to be sheared in order to rupture the seal. On the other hand, an increased diameter at this point will usually be accompanied with an increased diameter on the surface 18 (FIG. 1) so that additional force is available assuming that the pressure delivered by the squib gas generator 46 is the same. In fact, the ratio of the area of the surface 18 to the surface 20 (FIG. 1) may normally fall between 1.2 and 1.6. This is, of course, a function of the pressure drop from the chamber 14 to the chamber 28, as described hereinbefore.

Although not shown separately in the drawing, the inserts 70, 72 may be utilized without a land 74 on the insert 70. This would give the advantage, as is true in FIGS. 2 and 3, of allowing the metal of which the weld is formed to have different characteristics than the metal of which the cylindrical housing 10 or the piston 16 is formed. In a similar fashion, the land 74 could be provided on the insert 72 rather than on the insert 70.

Also not shown is the fact that the land 70 (FIGS. 2 and 3) could be provided in the metal of either the piston 16 or the cylindrical housing 10 without using inserts 70, 72. This would provide the advantage of having closely controlled welding tolerance without having to control the welding process to the same degree of precision, as described hereinbefore. In other words, the various aspects of the embodiment of FIGS. 2 and 3 could be utilized independently, or modified, while still practicing the present invention.

Although the invention has been shown and described with respect to preferred embodiments thereof, it should be understood by those skilled in the art that the foregoing and various other changes and omissions in the form and detail thereof may be made therein without departing from the spirit and scope of the invention, which is to be limited and defined only as set forth in the following claims.

I claim:
1. Fluid apparatus having a static seal comprising:
a pair of relatively movable parts, one of said parts comprising metallic walls of a chamber, the other of said parts comprising a metallic piston relatively movable into said chamber in response to fluid pressure means selectively acting thereon, a dynamic fluid seal means providing a first fluid seal between said piston and chamber walls at the end of the chamber closed off by said piston; and
a thin metallic weld between said piston and chamber walls, said weld providing a second fluid seal at the end of the chamber closed off by said piston adjacent said first fluid seal, said weld having a width at the point where said metallic piston is joined to said chamber wall which is sufficiently thin to allow rupture thereof upon movement of said piston in response to said fluid pressure means, said weld extending from the outward side of the chamber wall entirely through the chamber wall and into the piston.

2. The fluid apparatus according to claim 1 wherein one of said parts has a thin raised portion thereon, the other part contacting it only at the thin raised portion, the width of the weld being defined by the contact area of said thin raised portion.

3. The fluid apparatus according to claim 1 wherein one of said parts includes a metal insert at the point of contact with the other of said parts, said weld extending between the metal insert of said one part and into the other of said parts.

4. The fluid apparatus according to claim 3 wherein the other of said parts also has a metal insert at the point of contact between the parts, the inserts of each part contacting each other, said weld extending between said inserts so as to provide the seal.

5. The fluid apparatus according to claim 3 in which said metal insert is formed of a metal different from the metal of which said one part is formed.